United States Patent [19]
Bagshaw

[11] Patent Number: 5,893,963
[45] Date of Patent: Apr. 13, 1999

[54] APPARATUS FOR HANDLING ROPE

[76] Inventor: Frederick C. Bagshaw, 226 MacNab Street, Dundas, Ontario, Canada, L9H 2K1

[21] Appl. No.: 08/727,063

[22] Filed: Oct. 8, 1996

[51] Int. Cl.[6] .............................. B26D 7/10; B32B 31/18
[52] U.S. Cl. .................... 156/353; 83/16; 156/88; 156/251; 156/366; 156/515
[58] Field of Search ............................ 156/353, 359, 156/366, 515, 516, 518, 88; 83/16

[56] References Cited

U.S. PATENT DOCUMENTS

| | | | |
|---|---|---|---|
| 2,551,811 | 5/1951 | Mueller | 156/515 |
| 2,732,881 | 1/1956 | Anderle | 156/515 |
| 3,770,561 | 11/1973 | Kogert | |
| 3,772,112 | 11/1973 | Lyons et al. | 156/88 |
| 3,992,606 | 11/1976 | Arutt et al. | 219/243 |
| 4,332,637 | 6/1982 | Miller | 156/353 |
| 4,859,260 | 8/1989 | Tice | 156/515 |
| 4,975,140 | 12/1990 | Kang | 156/515 |

*Primary Examiner*—Daniel Stemmer
*Attorney, Agent, or Firm*—Rogers & Scott

[57] ABSTRACT

The invention provides apparatus for producing preselected lengths of rope from a supply of thermoplastic rope, and includes a rope feed system for advancing rope longitudinally along a rope path and a guillotine assembly coupled to the feed system. The guillotine assembly has a thermally conductive blade support mounted for reciprocal movement orthogonally with respect to the rope path, and a thermally conductive blade removably attached to the blade support. The blade is in good thermal contact with the blade support and movable with the blade support between a first position clear of the rope path and a second position in which the blade crosses the rope path. An electrical heating element is attached to the blade support to heat the support and thereby heat the blade to a temperature sufficient to fuse the rope locally. A blade actuator is coupled to the chassis and to the blade support for reciprocating the blade support and a control system is coupled to the rope feed system and to the guillotine assembly to actuate the rope feed assembly and the guillotine assembly. As a result, the blade engages the rope and applies heat so that the blade passes through the rope as the rope is softened and the sides of the blade fuse the rope ends to thereby fuse and sever the rope. The cycle is repeated in accordance with a counter in the control system and the lengths of the severed ropes are preselected in the control system.

16 Claims, 2 Drawing Sheets

APPARATUS FOR HANDLING ROPE

FIELD OF THE INVENTION

This invention relates to apparatus for fusing and severing thermoplastic rope, the apparatus being capable of producing selected lengths of rope from a supply of rope.

BACKGROUND OF THE INVENTION

Ropes of various types are normally distributed on spools which allow the purchaser to mount the spool and dispense the rope simply by pulling the rope to cause the spool to rotate. The rope on the spool is sufficiently long to provide a supply of rope for cutting to length as required, until the spool is used up.

Modern ropes made from synthetic plastics material are commonly thermoplastic. The user can fuse the end of the rope using a heating instrument of some kind. Commonly, the user will cut the rope after binding the location of the cut using a tape so that after cutting through the tape the end of the rope remains tight. The tape is left in place and then heat is applied to fuse the rope at the end. This prevents unravelling in use and separation of layers in the case of ropes that are multi-layered.

Although there is no difficulty with this process when rope is used occasionally, it is very labour intensive when used by manufacturers of products requiring a great number of preselected lengths of rope.

Because of these difficulties, various machines have been suggested for cutting rope to length. An example of such a machine is found in U.S. Pat. No. 4,332,637 to Miller. This patent issued in 1982 and illustrates a machine which measures rope, positions the rope for cutting, heats the rope locally using heated air to fuse a portion of the rope, and then a knife severs the rope through the heated portion. The cutting action is necessary because the relatively cold blade must be forced through the rope.

While the U.S. Pat. No. 4,332,637 demonstrates improvements over the prior art, it suffers from major disadvantages. First of all, air is not a good medium to apply heat to a rope because of the time it takes to transfer sufficient heat to fuse the rope. This delay can be significant, particularly in production machinery where speed is important. Secondly, the machine requires tuning so that the fusing of the rope takes place before the blade is used to sever it. Clearly, it would be difficult to ensure that the blade is used at just the right moment. Since the rope will vary in quality, this timing may require significant testing with the result being that some of the rope could be wasted. Also, the heat must be just sufficient to fuse the rope without actually melting it. The blade will tend to cool the rope and will require sufficient load to cut the rope.

The present invention is intended to overcome the disadvantages in the art and in particular disadvantages demonstrated in U.S. Pat. No. 4,332,637. In particular, the invention provides apparatus which uses heat to fuse and sever the rope contemporaneously to provide a more efficient operation.

SUMMARY OF THE INVENTION

The invention provides apparatus for producing preselected lengths of rope from a supply of thermoplastic rope, and includes a rope feed system for advancing rope longitudinally along a rope path and a guillotine assembly coupled to the feed system. The guillotine assembly has a thermally conductive blade support mounted for reciprocal movement orthogonally with respect to the rope path, and a thermally conductive blade removably attached to the blade support. The blade is in good thermal contact with the blade support and movable with the blade support between a first position clear of the rope path and a second position in which the blade crosses the rope path. An electrical heating element is attached to the blade support to heat the support and thereby heat the blade to a temperature sufficient to fuse the rope locally. A blade actuator is coupled to the chassis and to the blade support for reciprocating the blade support and a control system is coupled to the rope feed system and to the guillotine assembly to actuate the rope feed assembly and the guillotine assembly. As a result, the blade engages the rope and applies heat so that the blade passes through the rope as the rope is softened and the sides of the blade fuse the rope ends to thereby fuse and sever the rope. The cycle is repeated in accordance with a counter in the control system and the lengths of the severed ropes are preselected in the control system.

DESCRIPTION OF THE PREFERRED EMBODIMENT(S)

Figures 1, 2:
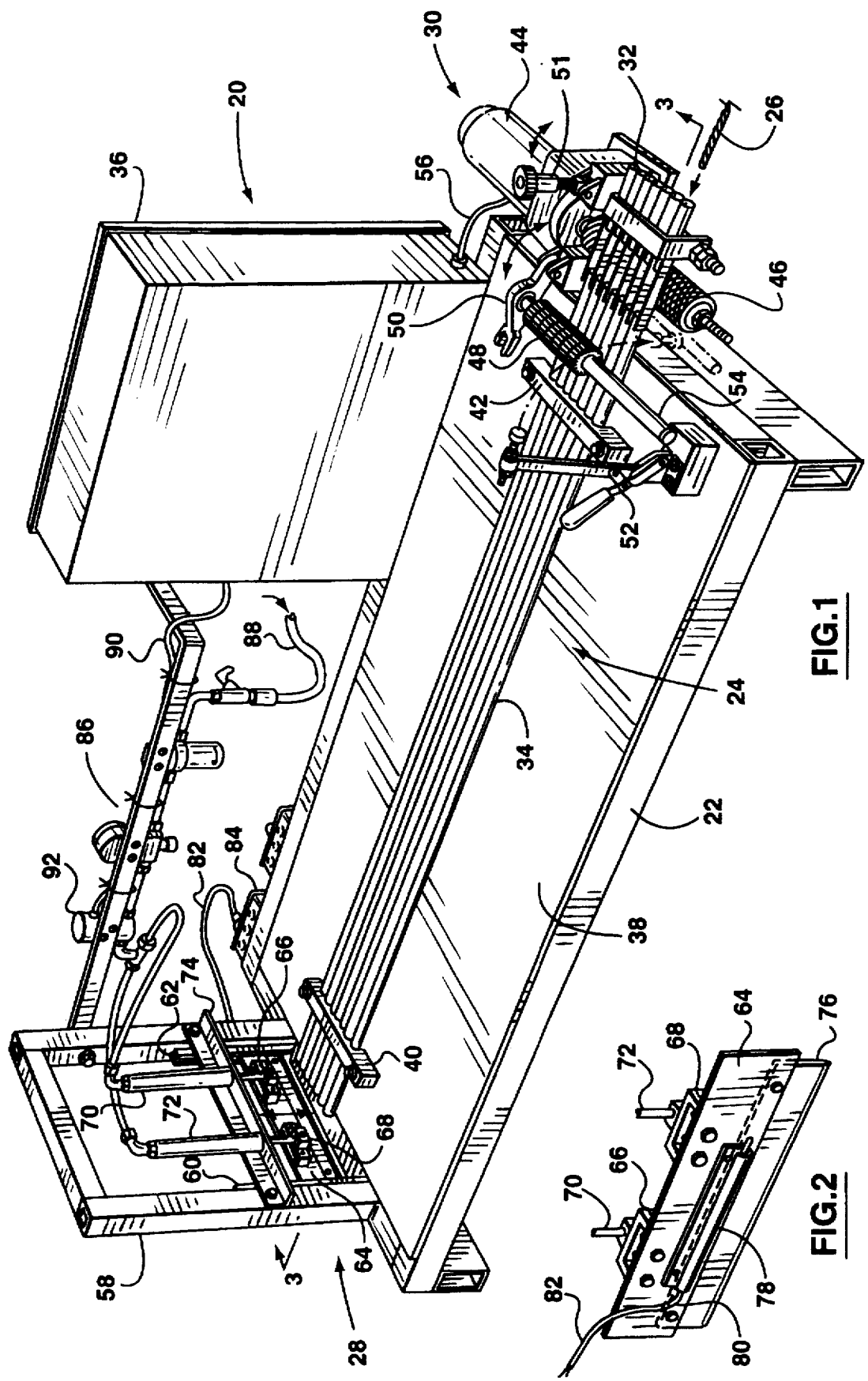
FIG. 1 is a perspective view of apparatus according to a preferred embodiment of the invention and viewing apparatus from the back to illustrate details of the apparatus.
FIG. 2 is an isometric view of a heated blade used in the apparatus.

Reference is made firstly to FIG. 1 which illustrates apparatus designated generally by the numeral 20 and including a chassis 22 supporting a rope feed system indicated generally by the numeral 24 which takes ropes from an inlet end of the chassis to an outlet end where a guillotine assembly 28 fuses and severs the ropes as will be described. The rope feed system 24 includes a rope advancing mechanism 30 which receives the ropes from individual tubular feed guides 32 and projects the ropes into tubular rope guides 34 leading the ropes to the guillotine assembly 28.

The rope advancing mechanism 30 and guillotine assembly 28 are operated by and controlled by a control system made up of conventional components familiar to those skilled in the art and contained in a control panel 36. As will be described, the arrangement is such that the advancing mechanism 30 is made to move the rope through a preselected length before stopping, and at that point the guillotine assembly is activated to fuse and sever the rope. The cycle is repeated as many times as selected in the control system.

The chassis 22 can be made up of any suitable materials such as the tubular peripheral members shown in FIG. 1. A planar top element 38 rests on the members for convenience to attach the rope guides 34 which are positioned using compression blocks 40, 42. These guides receive rope from the advancing mechanism 30 which consists essentially of a synchronous motor 44 driving a textured driven roll 46 which combines with an idler roll 48 mounted on a swing arm assembly 50. The load applied by this roll can be varied using a combination of a clamp screw 51 and an overcentre lever 52 which is positioned to engage an end of a shaft 54 carrying the idler roller 48 (as shown in ghost-outline). The swing arm assembly 50 and overcentre lever 52 are adjustable for difficult loads and thicknesses of rope. In other words, the idler roller 48 and driven roller 46 create a compression nip on the ropes so that rotation of the roller 46 will drive the ropes longitudinally through the rope guides 34, and at the same time draw the ropes through the feed guides 32 which maintain the ropes in alignment as they pass through the nip.

The rope advancing mechanism 30 is coupled electrically to the control panel 36 by a cable 56 which carries signals to start and stop the synchronized motor 44.

As the ropes leave the feed system 34, they meet the guillotine assembly 28. The rope movement will continue until such time as sufficient rope has passed the guillotine assembly to meet the requirements of the preselected length entered into the control panel 36. At this point, the control panel will discontinue driving the motor 44 in the rope advancing mechanism 30 and the guillotine assembly can then be actuated to fuse and sever the ropes.

As seen in FIG. 1, the guillotine assembly consists essentially of an upright frame 58 which depends from the chassis 22. A pair of sliders 60, 62 are mounted on the frame facing one another to provide guides for a blade support 64 to move vertically, i.e. orthogonally with respect the direction of the ropes as they move along a path dictated by the rope guides 34. It will be seen by reference to FIGS. 1 and 2 that the blade support 64 carries a pair of thermally insulated brackets 66, 68 to which are attached respective pneumatic actuators 70, 72. These actuators are mounted on a cross piece 74 extending between uprights in the frame 58.

As best seen in FIG. 2, the blade support 64 has a blade 76 attached to one side of the support and extending below the support, and at the other side of the support, a channel 78 is provided to carry a heating element 80 coupled by an electrical connection 82 to a power supply 84 (FIG. 1). The blade support 64 and channel 78 are preferably made from a material having a high thermal conductivity such as copper, and the blade 76 can be of a similar material because the blade is not performing a simple cutting action as will be described. The attachment of the blade is such that it can be replaced quite readily in the event of wear.

Although not shown in the drawings, it will be evident that the blade support 64 could be thermally insulated to minimize heat losses and make the machine more energy efficient.

Returning to FIG. 1, it will be seen that the pneumatic actuators 70, 72 are driven through a conventional pneumatic system 86 having a source of pneumatic pressure (not shown) and entering a tube 88. An electrical connection 90 is provided from the control panel 36 which cooperates with a solenoid 92 to supply pneumatic pressure to the actuators 70, 72. These actuators are internally spring loaded to return the blade support 64 and blade 76 to the position shown in FIG. 1 where the blade is out of the path of the ropes. When pressure is applied to the actuators, the blade and support are driven downwardly to extend across the path of the ropes as will be described.

Figure 3:
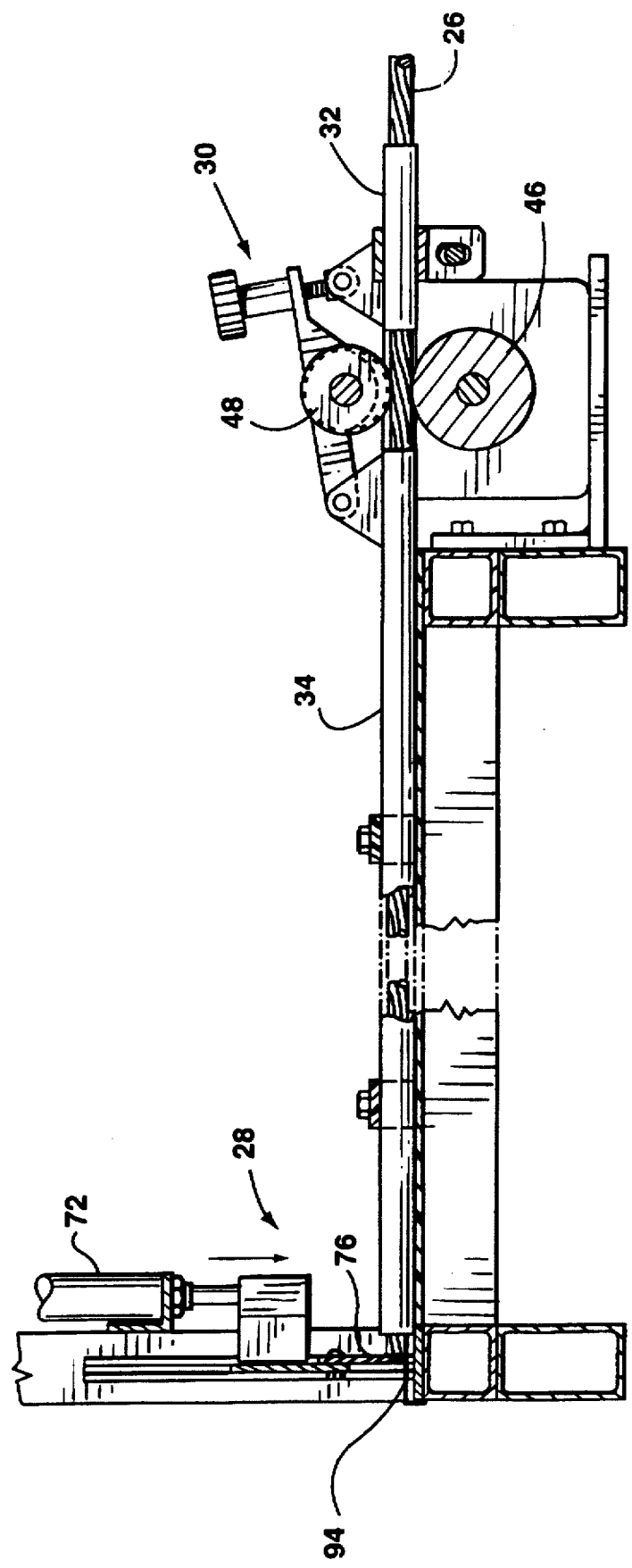
FIG. 3 is a sectional side view on line 3—3 of FIG. 1.

Reference is next made to FIG. 3 to describe the operation of the apparatus. It will be seen in FIG. 3 (which is a sectional view) that the rope 26 passes through the tubular feed guide 32 and then meets the mechanism 30 which drives the rope from right to left as drawn. The rope is contained in a nip between the driven roller 46 and the idler roller 48 and continues on through the rope guide 34, and leaves the rope guide at the guillotine assembly 28. The control panel 36 shown in FIG. 1 controls the movements. Initially, a signal is given to the rope advancing mechanism 30 to drive the rope and because the motor 44 is synchronous, the length of rope is proportional to the time of driving. A timer in the control panel is set and it is calibrated to rope length. When the preselected length has travelled past the guillotine assembly 28, the motor 44 stops and the heated blade 76 is moved gently downwardly by the actuators 70, 72 aided by gravity with a thermally conductive anvil 94 holding the rope in place. The gentle movement is to permit the blade 76 to meet the rope and transfer heat to the rope so that the rope is softened locally about the blade. This allows the blade to travel through the rope, crossing the path the rope normally travels and, because the rope is in contact with both sides of the blade as it passes through the rope, fusing will take place across the rope as this action continues. The result is not a cutting action, but a gradual contemporaneous process of both fusing and severing.

The movement of the actuators is preferably timed to ensure that sufficient heat is applied gradually to the rope. The rope will sever and fall and the blade will then return to the original position out of the path of travel of the rope. As soon as the blade is returned, the control panel activates the rope advancing mechanism 30 to move the rope through another cycle and create another length of rope of the preselected length.

It will be apparent from the drawings that in this embodiment there is structure to drive and guide seven ropes simultaneously, and then sever all of them at once to the preselected length. Clearly the number of ropes can be varied and in fact the apparatus is shown in FIG. 1 with the rope guides 34 to one side of the guillotine assembly to provide room to the left for more tubes. Clearly there is a limit for any given machine but it is important to understand that within the scope of the invention the number of ropes cut and handled simultaneously can be varied. Also the sizes of the ropes can be varied, possibly requiring changes to the rope guides 34 and feed guides 32.

Such variations are within the scope of the invention as described and claimed.

What is claimed is:

1. Apparatus for producing preselected lengths of rope from a supply of thermoplastic rope, the apparatus having:

a chassis including an inlet end and an outlet end;

at least one rope guide extending between the inlet and outlet ends;

a rope advancing mechanism at the inlet end for advancing rope along the rope guide towards the outlet end;

at least one rope feed guide aligned with said rope guide to maintain the rope in a straight path as the rope passes through the rope advancing mechanism;

a guillotine assembly coupled to the chassis at the outlet end of the chassis and located adjacent the rope guide, the guillotine assembly including a thermally conductive blade support mounted for reciprocal movement orthogonally with respect to the rope path, and a thermally conductive blade removably attached to the blade support, the blade being in good thermal contact with the blade support and movable with the blade support between a first position clear of the rope path and a second position in which the blade crosses the rope path, and an electrical heating element attached to the blade support to heat the support and thereby heat the blade to a temperature sufficient to fuse the rope locally;

a blade actuator coupled to the chassis and to the blade support for reciprocating the blade support;

a control system coupled to the chassis and including a first electrical power supply coupled to said heating element to heat the blade, an adjustable timer, a second electrical power supply coupled to the rope advancing mechanism, the timer including switch means coupled to the second power supply to energize and de-energize the second power supply in response to adjustment of the timer selected so that the rope will be advanced the preselected length, and an energy source coupled to the timer and to the blade actuator and operable after the rope has been advanced the preselected length to move the blade from said first position to said second position to heat and sever the rope leaving the severed ends sealed, and an adjustable counter operable to set a selected number of lengths of rope to be cut, whereby the control system causes repetition of a cycle in which a long length of rope is sequentially advanced by said preselected lengths, stopped while the rope is fused and severed contemporaneously, and again advanced to repeat the cycle the selected number of times.

2. Apparatus as claimed in claim 1 in which the blade support is copper.

3. Apparatus as claimed in claim 1 in which the rope guide is a straight tube proportioned so that the rope slides freely inside the tube while being guided by the tube.

4. Apparatus as claimed in claim 1 in which the blade actuator is operated pneumatically.

5. Apparatus as claimed in claim 1 in which the blade support moves vertically downwards from said first position to said second position so that the blade is assisted by gravity when fusing and severing the rope.

6. Apparatus as claimed in claim 1 in which the apparatus includes a plurality of rope guides and rope feed guides for handling a plurality of ropes simultaneously, and in which the rope advancing mechanism advances all of the ropes simultaneously and the blade fuses and severs all of the ropes simultaneously.

7. Apparatus as claimed in claim 6 in which the blade support is copper.

8. Apparatus as claimed in claim 6 in which the guides are straight tubes proportioned so that the rope slides freely inside the tubes while being guided by the tubes.

9. Apparatus as claimed in claim 6 in which the blade actuator is operated pneumatically.

10. Apparatus as claimed in claim 6 in which the blade support moves vertically downwards from said first position to said second position so that the blade is assisted by gravity when fusing and severing the rope.

11. In an apparatus used to produce preselected lengths of rope from a supply of thermoplastic rope, the apparatus having: a chassis including an inlet end; at least one rope guide extending between the inlet and outlet ends; a rope advancing mechanism at the inlet end for advancing rope along the rope guide towards the outlet end; at least one rope feed guide aligned with said rope guide to maintain the rope in a straight path as the rope passes through the rope advancing mechanism, the improvement in which the apparatus includes a guillotine assembly coupled to the chassis at the outlet end of the chassis and located adjacent the rope guide, the guillotine assembly including a thermally conductive blade support mounted for reciprocal movement orthogonally with respect to the rope path, and a thermally conductive blade removably attached to the blade support, the blade being in good thermal contact with the blade support and movable with the blade support between a first position clear of the rope path and a second position in which the blade crosses the rope path, and an electrical heating element attached to the blade support to heat the support and thereby heat the blade to a temperature sufficient to melt the rope locally, a blade actuator coupled to the chassis and to the blade support for reciprocating the blade support; and a control system coupled to the chassis and including a first electrical power supply coupled to said heating element to heat the blade, an adjustable timer, a second electrical power supply coupled to the rope advancing mechanism, the timer including switch means coupled to the second power supply to energize and de-energize the second power supply in response to adjustment of the timer selected so that the rope will be advanced the preselected length, and an energy source coupled to the timer and to the blade actuator and operable after the rope has been advanced the preselected length to move the blade from said first position to said second position to heat and sever the rope leaving the severed ends sealed, and an adjustable counter operable to set a selected number of lengths of rope to be cut, whereby the control system causes repetition of a cycle in which a long length of rope is sequentially advanced by said preselected lengths, stopped while the rope is fused and severed contemporaneously, and again advanced to repeat the cycle the selected number of times.

12. Apparatus for producing preselected lengths of rope from a supply of thermoplastic rope, the apparatus having:

a rope feed system for advancing rope longitudinally along a rope path;

a guillotine assembly coupled to the feed system, the guillotine assembly including a thermally conductive blade support mounted for reciprocal movement orthogonally with respect to the rope path, and a thermally conductive blade removably attached to the blade support, the blade being in good thermal contact with the blade support and movable with the blade support between a first position clear of the rope path and a second position in which the blade crosses the rope path, and an electrical heating element attached to the blade support to heat the support and thereby heat the blade to a temperature sufficient to fuse the rope locally;

a blade actuator coupled to the chassis and to the blade support for reciprocating the blade support;

a control system coupled to the rope feed system and to the guillotine assembly and operable to actuate the rope feed assembly and the guillotine assembly whereby the blade engages the rope and applies heat so that the blade passes through the rope as the rope is softened and the sides of the blade fuse the rope ends to thereby fuse and sever the rope.

13. Apparatus as claimed in claim 12 in which the blade support is copper.

14. Apparatus as claimed in claim 12 in which the feed system includes a straight tube to receive the tube, the tube being proportioned so that the rope slides freely inside the tube while being guided by the tube.

15. Apparatus as claimed in claim 12 in which the blade moves vertically downwards so that the blade is assisted by gravity when severing the rope.

16. In an apparatus for producing preselected lengths of rope from a supply of thermoplastic rope, the apparatus having: a rope feed system for advancing rope longitudinally along a rope path; a guillotine assembly coupled to the feed system for separating the rope into said lengths; a blade actuator coupled to the chassis and to the blade support for reciprocating the blade support; and a control system coupled to the rope feed system and to the guillotine assembly and operable to actuate the rope feed assembly and the guillotine assembly, the improvement wherein the guillotine assembly includes a thermally conductive blade support mounted for reciprocal movement orthogonally with respect to the rope path, and a thermally conductive blade removably attached to the blade support, the blade being in good thermal contact with the blade support and movable with the blade support between a first position clear of the rope path and a second position in which the blade crosses the rope path, and an electrical heating element attached to the blade support to heat the support and thereby heat the blade to a temperature sufficient to fuse the rope locally so that the blade applies heat locally to the rope to soften the rope to permit the blade to pass through the rope as the ends of the rope are fused by contact with the heated blade whereby the rope is fused and severed contemporaneously.

* * * * *